Sept. 12, 1939.   A. E. WILSHUSEN   2,172,814
BAFFLE PLATE VENTILATOR MECHANISM
Original Filed May 14, 1936
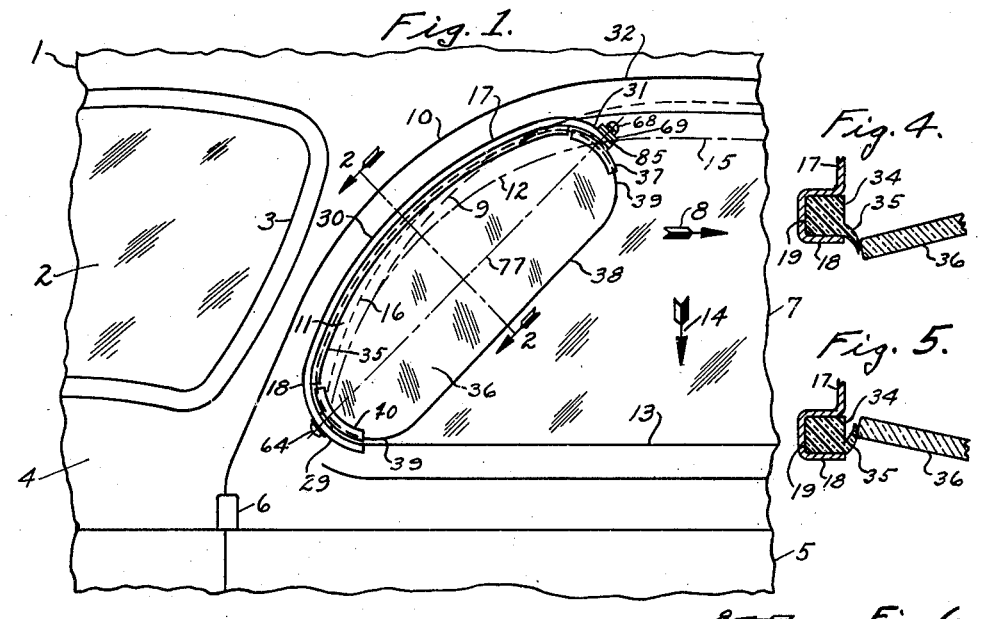
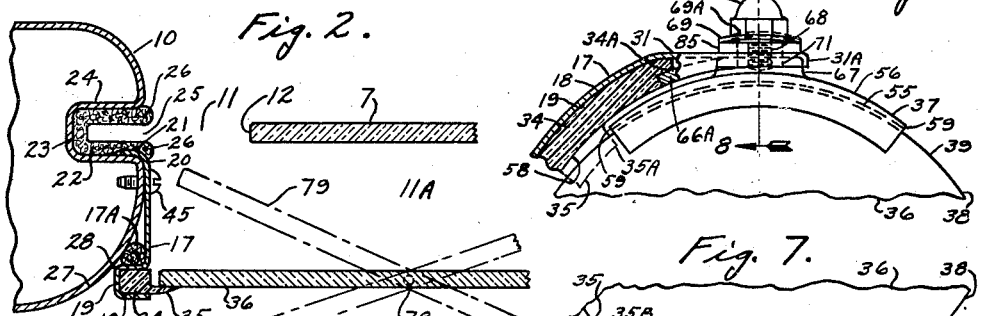
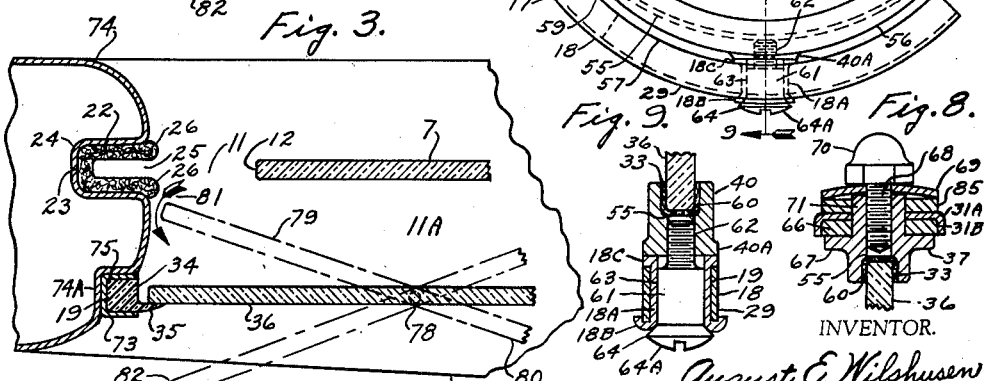
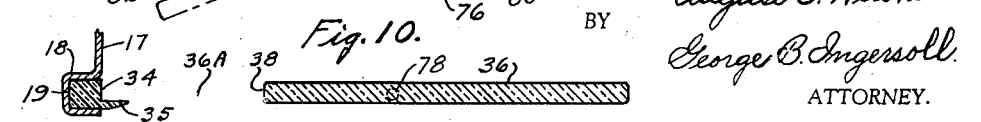
INVENTOR.
August E. Wilshusen
BY George B. Ingersoll
ATTORNEY.

Patented Sept. 12, 1939

2,172,814

UNITED STATES PATENT OFFICE 2,172,814

BAFFLE PLATE VENTILATOR MECHANISM

August E. Wilshusen, Detroit, Mich.

Application May 14, 1936, Serial No. 79,762
Renewed May 27, 1938

30 Claims. (Cl. 296—84)

My invention relates to improvements in ventilator mechanisms used in association with movably mounted windows of vehicles, and the objects of my invention are first, to provide a ventilator mechanism adapted for attachment to the frame structure of a vehicle and provided with a movably mounted baffle plate member adapted to be adjusted to various positions to facilitate ventilation of the vehicle; second, to provide a ventilator mechanism having a movably mounted baffle plate adapted to be positioned to cause air to be deflected into the body of a vehicle or to cause air to be drawn out of the body of the vehicle; third, to provide a ventilator mechanism having a movably mounted baffle plate adapted to be positioned adjacent a window structure of a vehicle to prevent air, rain, dust, etc., from passing between its forward edge or side and the frame of the window structure of the vehicle; fourth, to provide a ventilator mechanism having a movably mounted baffle member together with a frame structure adapted to be mounted directly in the frame structure of a window of a body of the vehicle as original equipment thereof; and fifth, to provide a ventilator mechanism having a baffle member adjustably mounted and adapted to be positioned normally in a closed position by a resilient member, the resilient member being adapted to permit the baffle member to deform or displace the resilient member to allow the baffle member to move past it to various adjusted ventilating positions.

I attain these objects by the mechanism illustrated in the accompanying drawing, in which:

Figure 1 is a partial side view of the body of an automotive vehicle equipped with my baffle plate ventilator mechanism; Fig. 2, a partial sectional view of the frame structure of the window of the vehicle together with a partial sectional view of the movably mounted window of the vehicle, said partial sectional view further disclosing a sectional view of the baffle plate ventilator mechanism taken on the line 2—2, Fig. 1; Fig. 3, a partial sectional view through the baffle plate ventilator mechanism, said partial sectional view disclosing an alternative design of my baffle plate ventilator mechanism supported directly in the frame structure of the window of the vehicle, said partial sectional view disclosing the alternate baffle plate ventilator mechanism in section substantially on a line positioned at 2—2, Fig. 1; Fig. 4, a partial sectional view of the baffle plate ventilator mechanism disclosing the baffle plate in a position where it is being swung outwardly past a cushion or gasket member retained in the frame structure of the ventilator mechanism; Fig. 5, a partial sectional view of the baffle plate ventilator mechanism disclosing the baffle plate in a position where it is being swung inwardly past a cushion or gasket member retained in the frame structure of the ventilator mechanism; Fig. 6, a partial plan view of the ventilator mechanism disclosing the upper means for movably supporting the baffle plate in the frame structure of the ventilator mechanism; Fig. 7, a partial plan view of the ventilator mechanism disclosing the lower means for movably supporting the baffle plate in the frame structure of the ventilator mechanism; Fig. 8, a partial sectional view of the support structure for the baffle plate of the ventilator mechanism, said partial sectional view being taken on the line 8—8, Fig. 6; Fig. 9, a partial sectional view of the support structure for the baffle plate of the ventilator mechanism, said partial sectional view being taken on the line 9—9, Fig. 7; and Fig. 10, a partial sectional view of the ventilator mechanism taken in a line positioned substantially at 2—2, Fig. 1, and disclosing the baffle plate as having been rotated substantially through an angle of 180 degrees from its normal position.

Similar numerals refer to similar parts throughout the several views.

The body 1 of the automotive vehicle disclosed in Fig. 1 comprises the front window or the windshield 2 having a frame portion 3 located on the front and sloping side 4 of the body 1.

The body 1 further comprises the front or side door 5 which is pivotally mounted on the hinge 6, said door 5 thus being located at the front and left side of the body 1 and adjacent the left side portion of the front window and the sloping wall portion 4 of the body 1.

The door 5 is provided with the window or glass 7 which is movably mounted in a conventional way in said door of the automotive vehicle, the glass 7 being movably operated in many conventional cars, first in a rearwardly direction as indicated by the arrow 8, Fig. 1, which first provides an initial opening of relatively narrow width, as indicated by the position of the dotted line 9, Fig. 1, relative to the rear side of the frame 10 of the window structure of the door, the rearward movement of the glass 7 thus providing a relatively narrow space 11, indicated in Fig. 2 between the rear side of the frame 10 of the window structure of the door 5 and the dotted line 9 in Fig. 1, and which indicates the position of the forward edge 12 of the glass or window 7 before the further operation of the operable movement of the glass 7 to an increased opened position, the glass 7 in many conventional automotive vehicles then being possible of movement downwardly and past the lower or bottom frame 13 of the door 5 and in the direction of the arrow 14 as disclosed in Fig. 1, the further downward movement of the glass 7 resulting in an initial opening between the upper portion 32 of the frame 10 and the upper edge of the glass 7 as indicated by the dotted lines 15 in Fig. 1.

Also it is to be noted that in some conventional window operating mechanisms of the doors of automotive vehicles, the glass 7 will be moved initially and directly downwardly, as indicated by the arrow 14 in Fig. 1, without first travelling rearwardly to establish an opening between the rear side of the frame 10 and the forward edge 12 of the glass 7, as indicated by the dotted line 9, Fig. 1, this slightly different operation of the conventional door or window of automotive vehicles resulting in an initial opening or space between the rear side of the frame 10 and the front edge 12 of the glass 7, as indicated by the dotted lines 16, Fig. 1, said opening indicated at its rear side by the dotted line 16 having substantially an equal width for the greater portion of the length but further resulting in a decreasing space or width at its upper portion until the upper edge of the glass 7 is lowered sufficiently in the direction of the arrow 14 to be removed at some distance from the upper portion 32 of the frame 10 of the door 5, the upper edge of the glass 7 extending within and above the lower side of the portion 32 of the frame 10 as indicated by the upper or extended portion of the line 16.

With all of these various described movements of the glass 7, a relatively narrow space 11 is initially obtained and formed between the rear side of the frame 10 and the forward edge 12 of the glass 7, which in conjunction with the passage 11A forms an air passage connecting with the interior of the body 1 to provide ventilation means and characteristics for the interior of the body 1 without exposing the occupants of the body 1 to a flow or passage of cold air, rain, dust, etc., between the frame 10 and the baffle plate members from the outside of the body into the interior thereof when the baffle plate ventilator mechanism is adjusted in its normal position, the further movement of the glass 7 in its rearward and downward directions, as indicated by the arrows 8 and 14 in Fig. 1, being reserved for weather conditions in which an extreme amount of air is desired to be passed or allowed to flow into or out of the interior of the body 1 in accordance with the adjusted positions of the baffle plate ventilator mechanism.

The relatively small amount of air which passes through the space 11 and the air passage 11A during the initial movements of the glass 7 are required to allow movement of minimum amounts of air to flow to the outside atmosphere from the interior of the body 1 in such quantities only to provide proper ventilation characteristics of the body 1, said air flowing from the interior of the body 1 through the spaces 11 and 11A being replaced by infiltration of colder and fresh air into the body 1 in a conventional way as by passing through cracks, window and door operating clearance spaces, cowl ventilators, etc., and in this operation there is a tendency for the passage of the air from the interior of the body 1 at relatively high speeds especially when the automotive vehicle is in motion and extreme openings of the glass 7 result in an undesired and too intensive draft upon the occupants of the body 1 as well as a tendency in conventional window constructions for rain, snow and sleet in stormy weather to also be swept around the outside surface of the frame 10 and through the opening 11, thus further resulting in inconveniences and discomfort to the occupants of the vehicle as a result of the necessity of obtaining ventilating characteristics within the body 1 of the automotive vehicle.

These inconveniences and disadvantages are accentuated by the conventional type of deflector mechanisms which are pivotally mounted at the outside of the frame 10 and with more or less openings and apertures between the deflector portions of such ventilator mechanisms and the outside surface of the frame 10, this resulting in the passage of air, sleet, dust, rain, dirt, etc., past the forward edges of the conventional ventilator mechanisms and resulting in inefficient ventilation characteristics of the body 1.

My baffle plate ventilator mechanism comprises the frame 17 which is preferably constructed and formed from a thin sheet of metal such as steel, aluminum or similar material and is provided with a channel or guide portion 18 at its outer side and having the recess or groove 19 therein, the frame 17 being further provided at its inner edge with the curved or radial portion 20 as disclosed in Fig. 2 and which is extended to form the flange 21 which is adapted to be entered between the resilient or flexible cushion member 22 which is conventionally used in window structures, the cushion member 22 being mounted in the recess 23 of the channel portion 24 which extends longitudinally along the inner edge portion of the frame 10, the cushion member 22 being formed with a space or recess 25 for receiving the forward edge 12 of the glass 7 when it has been operated to its fully closed position and in contact with the inner surfaces of the recess 25, the cushion member 22 being provided with the bead portions 26 at each of its sides. In installing the frame 17, the flange 21 thereof is inserted between a bead 26 and the side of the channel portion 24 as disclosed in Fig. 2, the inner side of the channel portion 18 tightly contacting the outside curved surface 27, as indicated at 28, Fig. 2, thus effectively providing a tight closure between the channel portion 18 of the frame member 17, and the outside surface 27 of the frame 10. A packing or gasket member 17A constructed of rubber, felt, or similar resilient material and of substantially cylindrical shape is interposed between the outside curved surface 27 and the frame member 17 and adjacent the corner formed by the channel portion 18, said gasket member 17A extending substantially for the length of the frame member 17 and being compressed or distorted thereby as disclosed in Fig. 2 when the frame member 17 is fastened in its assembled position.

The section of the frame member 17 disclosed in Fig. 2 extends substantially for the greater portion of the longitudinal length of the frame member 17, the frame member 17 being formed at its lower side with a curved or radial portion 29 for fitting tightly against the curved surface at the forward corner of the window opening of the door 5, the frame member 17 being provided with the elongated or curved portion 30 at its forward and upper side to conform to the shape of the rear surface of the frame 10 of the door 5, the frame member 17 being formed at its uppermost side to conform to the lower side of the upper portion of the frame 10 of the door 5.

The frame 17 thus extends longitudinally along the forward side of the frame 10 of the window structure of the door 5 and is constructed at its upper side to form the overhanging end or flattened portion 31, the channel portion 18 having its side wall portions diminished to blend into the flattened portion 31, the flattened portion 31 being displaced to form the flanged boss 31A.

The recess 19 of the channel portion 18 of the frame member 17 is adapted to receive the resilient cushion or gasket member 34 which is preferably constructed of felt, rubber or similar material and is provided with the flange portion 35 extending adjacent one of its sides, the cushion member 34 forming a tight closure between the wall portions of the recess 19 of the channel portion 18 and the side of the baffle plate 36 which has its forward and upper edges shaped to conform with the shape of the frame member 17, the rearward edge 38 of the baffle plate 36 extending downwardly and forwardly substantially in a plane located substantially parallel with the general direction in which the frame member 17 extends longitudinally at the forward side of the window opening of the door, the end portions 39 of the baffle plate 36 being formed with a circular or radial shape to conform and fit within the channel portions 33 of the upper bracket 37 and the lower bracket 40, said brackets 37 and 40 being rotatably mounted on trunnion supports in the frame member 17 as more fully hereinafter described.

The baffle plate 36 is constructed of transparent or translucent material such as glass, Celluloid, or similar transparent or translucent material and will be of such section as to provide substantial rigidity thereof.

The upper and lower brackets 37 and 40 are each provided with a radial surface 55 at the bottom of their channel portions 33, said radial surfaces 55 being located substantially eccentric with the outer radial surfaces 56 of the brackets 37 and 40, the radial surfaces 56 being further located substantially concentric with the radial surfaces 57 of the lower end of the channel portion 18, the radial surface 56 of the upper bracket 57 being located substantially concentric with the radial surfaces 58 at the upper end of the channel portion 18, the brackets 37 and 40 thus being adapted to be oscillated or rotated relative to the channel portion 18 which movably supports the bracket members 37 and 40 as hereinafter described.

It is also to be noted that the radial surfaces 55 in the bottom of the channel portions 33 will have substantially a larger radius than would otherwise be the case if the radial surfaces 55 were located concentric with the surfaces 56 and 57 above described, the larger radius of the surfaces 55 facilitating the positioning of the edge portions of the baffle plate 36 closer to the main portion of the cushion member 34 mounted in the channel portion 18 of the frame member 17 as disclosed in Figs. 6 and 7, the different centers of the radial surfaces 55 and 56 providing relatively narrow edge portions of the brackets 37 and 40 as indicated at 59 in Figs. 6 and 7.

The cushion members 60 will be mounted in the channel portions 33 of the brackets 37 and 40 to provide proper cushioning support for the end portions 39 of the baffle plate 36, the cushion members 60 being constructed of rubber, felt, or similar material having sufficient resilient characteristics so that when they are assembled in the channel portions 33 they will grip the end portions 39 of the baffle plate 36 sufficiently to hold it rigid therein.

The lower bracket 40 is provided with a collar or flange portion 40A which engages the inner surface of the collar or flange 18C of the bushing 18A and thus spaces the radial surface 56 of the bracket 40 away from the radial surface 57 of the channel portion 18 to permit oscillation or rotation of the bracket 40 together with the baffle plate 36 mounted therein.

The bracket 40 is further provided with a threaded hole for receiving the extension portion 62 which extends from the journal or trunnion portion 61 of the screw 64 and extends between the side portions of the channel portion 18 of the frame member 17 to form a bearing in the bore 63 of the bushing 18A which thus rotatably supports the bracket 40.

The bushing 18A is spun over at 18B and is movably engaged by the countersunk portion of the head 64A of the screw 64. The bushing 18A is further provided with the collar or flange 18C for engaging the collar 40A of the lower bracket 40, the collar or flange 18C engaging the inner edge surface of the channel portion 18.

The upper bracket 37 is similarly provided with a collar or flange portion 67, the outer surface of which engages the washer 66 which is mounted in the recess 31B of the flanged boss 31A, the washer 66 being provided with the extension 66A which extends into the recess 19 of the channel 18 to engage the notch portion 34A of the cushion 34 to retain it in the recess 19, the collar 67 thus spacing the bracket 37 away from the upper end of the channel portion 18.

The washer 85 is mounted on the upper side of the flattened portion 31 and with the washer 66 forms upper and lower thrust washers rotatably mounted for supporting the upper and lower brackets 37 and 40, the washers 85 and 66 being preferably constructed of bronze or similar bearing material for engaging the flattened portion 31 of the frame member 17 which is preferably constructed of steel, aluminum or similar material.

The screw 68 extends through the wall portion of the flattened portion 31 of the channel portion 18 and is engaged by the washer 69 which is held against the upper end of the extension portion 71 of the upper bracket 37 which thus forms a journal or trunnion having a bearing in an opening through the flattened portion 31, the upper end of the extension portion 71 extending slightly above the upper surface of the washer 85 to insure the washer 69 being drawn up tightly against the extension portion 71, the washer 69 being constructed with resilient characteristics and with an initial bow shape as indicated by the dotted lines 69A, Fig. 6, the resilient characteristics of the washer 69 thus retaining the washers 66 and 85 and the upper bracket 37 in bearing engagement with the flattened portion 31.

The extension portion 71 of the upper bracket 37 is provided with a tapped hole for engaging the screw 68 to permit rotation and oscillation of the baffle plate 36 together with the upper bracket 37 and the lower bracket 40, the screw 68 being provided with the head 70 for engaging the washer 69.

It is to be here noted that the assembly of the screw 68 in the extension portion 71 extending through the flattened portion 31 and the assembly of the screw 64 in the bushing 18A will permit the baffle plate 36, together with the upper bracket 30 and the lower bracket 40, to be readily removed from its supporting structure.

The flange portion 35 of the cushion member 34 is cut away at the points 35A and 35B, as indicated by dotted lines in Figs. 6 and 7, to provide clearance for the oscillating movements of the upper and lower brackets 37 and 40.

The left hand baffle plate ventilator mechanism which is disclosed as being installed adjacent the left hand forward window of the forward door of the body 1 of the vehicle in Fig. 1, will be readily adapted for installation in a similar way on the right hand forward window of the forward door of the body 1 by making the frame member 17 of right hand construction and which will be substantially opposite to that as disclosed in Fig. 2.

The frame member 17 of similar parts used as support means are each provided with a suitable number of openings for receiving the screws 45 which extend therethrough and threadably engage portions of the frame 10. The baffle plate ventilator mechanism as disclosed in Figs. 1, 2 and Figs. 4 to 9 inclusive, is especially adapted for use as an accessory to be installed after the body 1 has been constructed and with variations in its shape, form, etc., it can be readily adapted to various shaped windows of various sizes.

When it is desired to install my baffle plate ventilator mechanism as an integral part of the original equipment of the body 1, the channel member 73 may be rigidly secured in the shouldered recess 74A as disclosed in Figs. 3, the frame 74 of the window structure of a door 5 being initially constructed with the shouldered recess 74A extending around the forward portion of the frame 10 to permit the inside wall portion of the channel member 73 to be suitably secured to the rear wall portion of the shouldered recess 74A as indicated at 75 in Fig. 3 by welding or similar means, the channel member 73 being provided with a groove portion 19 for receiving and retaining the cushion member 34 therein similarly to the manner disclosed in Fig. 2.

It is to be noted that the baffle plate 36 will be mounted substantially parallel with the glass 7 as disclosed in Figs. 2 and 3 and will have an over-all width so that when it is in its normal position in contact with the flange 35 of the cushion member 34 as disclosed by the full lines in Figs. 2 and 3, the baffle plate 36 will not extend beyond the extended outer side wall of the door 5, thus eliminating any portions of the baffle plate 36 extending beyond the extended outer line of the door 5 and thus further preventing any interference with adjacent streamline construction of the body 1 as would be the case if the baffle member 36 extended beyond the outer door line 76 as indicated in Fig. 3 and in which extended position the trailing peripheral edge portions of the baffle plate 36 will interfere with the slip or air stream flowing past the body 1.

However, it is to be noted that the baffle plate 36 being rotatably mounted is adapted to be swung inwardly about its axis of rotation, as indicated by the line 77, Fig. 1, and as further indicated by the centers 78 in Figs. 2, 3, and 10 so that the forward portion of the baffle plate 36 may be moved away from the flange 35 to the position as indicated by the dotted lines 79 in Figs. 2 and 3, the forward portion of the baffle plate 38 having the longest or greatest width from the axial line 77, the rotating or oscillating movement of the baffle plate 38 to the position indicated by the dotted lines 79 in Figs. 1 and 2 thus moving the rear portion of the baffle plate 36 to the position indicated by the dotted lines 80 in Figs. 1 and 2 and in which positions the rear portion of the baffle plate 36 will engage the slip or air stream or air flowing past the body 1, the slip or air stream tending to pull air from the interior of the body 1 through the passage or opening 11 and between the forward edge of the baffle plate 36 and the rear portions of the frames 10 or 74 as indicated by the arrow 81 in Fig. 3, as well as through the passage 11A, thus providing ventilation characteristics for the body 1.

It is to be noted that when the baffle plate 36 is in its normal position substantially parallel with the window 7, the forward edge portion of the baffle plate 36 will contact the flange 35 of the cushion member 34 to position it in its normal position and to form a closure therebetween.

However, the flange portion 35 of the cushion member 34 due to its resilient characteristics may be readily displaced as disclosed in Fig. 4 so that the baffle plate 36 may be swung outwardly with its forward edge portion assuming a position as indicated by the dotted lines 82 in Figs. 2 and 3 and in which position 82, a portion of the slip or air stream passing rearwardly past the body 1 will be scooped or guided to flow between the frames 10 or 74 and the forward edge of the baffle plate 36 in its position indicated at 82 and will further pass through the passage or opening 11 directly into the body 1, thus providing an increased or forced draft of a greater amount of fresh air into the body 1 as desired by the occupants of the vehicle, the rotatably or oscillating operation of the baffle plate 36 thus enabling the occupants of the vehicle to position the baffle plate 36 so that any desired condition of ventilation may be obtained through the adjustment thereof.

Fig. 5 further discloses the baffle plate 36 as having been rotated or oscillated from its position as indicated by the dotted lines 82 past the flange 35 of the cushion member 34 to an inward position similar to that indicated at 79 in Figs. 2 and 3, the flange 35 of the cushion member 34 thus permitting the baffle plate 36 to be swung to and fro past the flange 35 and yet at the same time the characteristics of the flange portion 35 will always right it to a normal position in which it will act as a stop member for positioning the baffle plate 36 in its normal position substantially parallel with the window 7.

Fig. 10 discloses the baffle plate 36 as having been rotated or oscillated through an angle of substantially 180 degrees from its normal position to provide a substantial opening 36A between its forward edge and the cushion member 34 and with the baffle plate 36 positioned substantially parallel with the window 7 to provide further adjustable ventilating characteristics.

In operation my baffle plate ventilator mechanism is installed in the forward end of the movable window of a door of a vehicle and is secured to the front frame of the door either by securing the frame portion thereof by screws or by inserting it between the resilient cushion members and the frame members in which said cushioning members are installed, and which are utilized for receiving the movably mounted windows of the door, or the ventilator mechanism may be installed directly with the use of a frame member having a channel portion which is suitably secured to and forms an integral portion of the frame of the window structure of the doors of the vehicle.

After the ventilator mechanisms are secured to the frame of the doors of the vehicle, the baffle plate 36 may be oscillated by the occupants of the vehicle to a position in which its forward edge portions extend inwardly so that a portion of the air of the vehicle is drawn outwardly between the regular or standard windows 7 of the door and between the forward edge portion of the baffle plate 36 and the rear portion of the frame of the door as well as through the passage 11A to withdraw any desired amount of air from the interior of the body by the action of the slip or air stream passing by the body 1.

Also the baffle plate 36 may be positioned in engagement with the flange portion 35 of the cushion member 34 to provide a closure between the baffle plate 36 and the frame portion of the door so that with the opening of the standard windows 7 any desired amount of air may be withdrawn from the interior of the body through the passage or opening 11 and through the passage 11A out into the slip or air stream passing by the body 1.

Also when desired the baffle plate 36 may be located or oscillated so that its forward portion will extend outwardly to provide an opening between its forward edge portion and the forward frame member of the door of the vehicle to catch or scoop in any desired portion of the slip or air stream passing the vehicle to cause said portion of air to pass directly through the opening or passage 11 into the interior of the body 1 under a forced draft or pressure developed by the slip or air stream flowing past the vehicle.

Also, if desired, the baffle plate 36 may be rotated or oscillated through an angle of substantially 180 degrees from its normal position to position its shorter side, relative to its axis, at the front side of the ventilator mechanism to provide a substantial opening 36A between the cushion member 34 and the baffle plate 36, as disclosed in Fig. 10, the baffle plate 36 then being positioned substantially parallel with the window 7.

Also the forward portion of the baffle plate 36 which has the greatest width from the axial line 77, as disclosed in Fig. 1, will, due to its decreasing sections or widths as it approaches its end portions 39, approximately equal in its projected area, the projected area of the rear portion of the baffle plate 36, as disclosed in Fig. 1, the rear portion although having a lesser width from the axial line 77 nevertheless has substantially an equal width throughout the greater portion of its length to thus render said rear portion substantially equal in area to said forward portion. The substantially equal areas of said forward and rear portions will thus balance themselves about the axis or axial line when absorbing a thrust of the slip or air stream passing the body 1.

I claim:

1. In a baffle plate ventilator mechanism for a body of a vehicle provided with a door having a movable window together with a frame provided with a groove for holding a cushion member for receiving the movable window therein, the combination of a frame member conforming to the shape of a portion of the frame of said door, said frame member having a flange at its inner side and adapted to extend between the side of said cushion member and a side of said groove of the frame of said door, said frame member being provided with a channel portion at its outer side, a gasket member interposed between said frame member and the frame of said door, a cushion member mounted in said channel portion of said frame member and provided with a resilient flange, a pair of brackets rotatably mounted at opposite end portions of said frame member about a common axis, and a baffle plate mounted in said pair of brackets and adapted to be moved past said resilient flange of said cushion member, said baffle plate displacing said resilient flange of said cushion member when moved past said resilient flange, said baffle plate being adapted to engage and form a closure with said resilient flange when said baffle plate is positioned in a plane substantially parallel to said movable window.

2. In a baffle plate ventilator mechanism for a window of a vehicle, the combination of a frame member mounted adjacent said window and provided with a channel portion having one of its ends formed to provide an overhanging end portion having a flanged portion provided with a recess, a bracket provided with an extension portion together with a collar adjacent said extension portion, said extension portion extending through said flanged portion of said frame member, a thrust washer mounted in said recess of said overhanging end portion of said frame member and surrounding said extension portion of said bracket, said thrust washer being provided with an extension portion extending within said channel portion of said frame member, a second thrust washer mounted adjacent an oppositely disposed surface of said overhanging end portion relative to said recess thereof, said second thrust washer surrounding said extension portion of said bracket and having its outer surface located below the end surface of said extension portion, a resilient washer engaging an end surface of said extension portion and the outer surface of said second thrust washer, a screw extending through said resilient washer and threadably engaging said extension portion of said bracket to hold said resilient washer in engagement with said extension portion and said second thrust washer, a second bracket rotatably supported by an oppositely disposed portion of said frame member relative to said overhanging end portion member and provided with a channel portion, a baffle member supported by said channel portions of said first mentioned and said second brackets and adapted to move therewith, and a cushion member mounted in said channel portion of said frame member and adapted to engage said baffle member, said cushion member being provided with a notch portion adapted to engage said extension portion of said first mentioned thrust washer.

3. In a baffle plate ventilator mechanism for use with a movable window, the combination of a frame member mounted adjacent said movable window and having curved end portions, a pair of bracket members rotatably supported by said frame member and each provided with a channel portion extending longitudinally along a radial path, and a baffle member having rounded ends supported in the channel portions of said pair of bracket members, said rounded ends of said baffle plate being formed with a radius larger than the radius of said radial path of said channel portions of said pair of bracket members, said rounded end portions permitting either side of said baffle member to be positioned at the front side of the axis thereof.

4. In a baffle plate ventilator mechanism for use with a window, the combination of a frame support member provided with end portions, a pair of brackets rotatably supported by said end portions of said frame support member, the rotative support structure of one of said pair of brackets comprising a pair of washer members oppositely disposed about one of said end portions of said frame support member together with a screw and a resilient member for maintaining said washer members in engagement with said support frame member and said one of said pair of brackets, a baffle plate supported by said pair of brackets, and a cushion member mounted in said frame support member and adapted to engage said baffle plate, said baffle plate having its axis inclined downwardly and forwardly, said baffle plate providing a space under said baffle plate, said space being located above the bottom of said window.

5. In a baffle plate ventilator mechanism for use with a window, the combination of support means mounted adjacent said window and provided with curved end portions, bracket members rotatably supported by said curved end portions of said support means and provided with curved channel portions having collars for spacing said curved channel portions of said bracket members away from said curved end portions of said support means, and a baffle plate supported in said curved channel portions of said bracket members, said baffle plate being adapted to be moved to a closed position relative to said support means, said baffle plate and said bracket members having a common axis, said baffle plate, said bracket members and said curved ends of said support means all being located in a plane parallel with said window when said baffle plate is in its closed position relative to said support means.

6. In a baffle plate ventilator mechanism for a window of a vehicle, the combination of a frame member mounted adjacent said window and provided with a channel portion having a curved end portion, a bracket provided with a channel portion together with a collar portion, a bushing member mounted in said channel portion of said frame member and provided with a collar portion for engaging said collar portion of said bracket, said bushing being provided with a bore therethrough, a trunnion member journalled in said bore of said bushing member and engaging said bracket, said trunnion member being provided with a head portion for engaging an end portion of said bushing member, a second bracket rotatably supported by a portion of said frame member oppositely disposed to said curved end portion of said frame member and provided with a channel portion, a baffle member supported by said channel portions of said brackets and adapted to move therewith, and a cushion member mounted in said channel portion of said frame member and adapted to engage said baffle member.

7. In a ventilator mechanism for a window of a vehicle, the combination of a frame structure for said window and provided with a groove for receiving the window thereinto, said frame being further provided with a shouldered recess extending longitudinally adjacent a side portion of said frame structure, a support member mounted in said shouldered recess and provided with extension portions, brackets rotatably mounted in said extension portions of said support member, a glass plate supported by said brackets, and a cushion member mounted in said support member and adapted to engage said glass plate.

8. In a baffle plate ventilator mechanism for a window of a vehicle, the combination of a frame member mounted adjacent said window and provided with a channel portion having one of its ends formed to provide a support for a bracket, a bracket rotatably supported by said formed end, said bracket being provided with a shaft portion extending through said formed end, a pair of thrust washers surrounding said shaft portion of said bracket, said thrust washers being oppositely disposed about said formed end, a resilient washer surrounding said shaft portion of said bracket and engaging one of said thrust washers, means engaging said shaft portion of said bracket to hold said resilient washer in engagement with said thrust washer, a second bracket rotatably supported by an oppositely disposed portion of said frame member relative to its formed end, and a baffle member supported in said first mentioned and said second brackets.

9. In a baffle plate ventilator mechanism for a window of a vehicle, the combination of a frame member mounted adjacent said window, a bracket rotatably supported in an end portion of said frame member, said bracket being provided with a shaft portion extending through said end portion, a pair of thrust washers mounted on opposite sides of said end portion and surrounding said shaft portion, a resilient washer engaging one of said thrust washers, means for compressing said resilient washer against said thrust washer, a second bracket rotatably supported in an oppositely disposed end portion of said frame member, and a baffle member supported in said first mentioned and said second brackets.

10. In a baffle plate ventilator mechanism for a window of a vehicle, the combination of a frame member mounted adjacent said window, a bracket rotatably supported by said frame member, a pair of oppositely disposed thrust washers between said bracket and said frame member, resilient means for maintaining said thrust washers, said bracket and said frame member in engagement, a second bracket rotatably supported by said frame member, and a baffle member mounted in said brackets.

11. In a baffle plate ventilator mechanism for a window of a vehicle, the combination of a frame member mounted adjacent said window and provided with a channel portion together with an end portion, a bracket rotatably mounted in said end portion, a thrust washer between said end portion and said bracket, a second bracket rotatably mounted in said frame member, a baffle member mounted in said first mentioned and said second brackets, and a cushion member mounted in said channel portion of said frame member and adapted to engage said baffle member, said cushion member engaging said thrust washer to provide retention of said cushion member.

12. In a baffle plate ventilator mechanism for a window of a vehicle, the combination of a frame member mounted adjacent said window and provided with a channel portion, a bushing mounted in the channel portion of said frame member, said bushing being provided with a collar engaging the inner edge surfaces of said channel portion, said bushing being provided with a second collar portion engaging the outer surface of said channel portion, said second collar portion being formed by spinning over an end of said bushing, said bushing being provided with a countersunk portion at its outer end, a bracket provided with a collar portion engaging one end of said bushing, a trunnion member journalled in said bushing and connected with said bracket, said trunnion member being provided with a conical portion engaging said countersunk portion of said bushing, a second bracket rotatably supported by said frame member, and a baffle member supported by said first mentioned and said second brackets, said baffle member, said brackets and said trunnion member being located in axial alignment.

13. In a baffle plate ventilator mechanism for a window of a vehicle, the combination of a frame member mounted adjacent said window and provided with a bearing means, one of said bearing means comprising a bushing suitably anchored in said frame member and provided with a spun over end, a bracket adjacent one end of said bearing means, a trunnion member journalled in and extending through said bushing of said bearing means and threadably with said bracket, said trunnion member being provided with a head portion extending within and engaging said spun over end of said bushing, a second bracket rotatably supported by said frame member, and a baffle member supported by said first mentioned and said second brackets.

14. In a deflector mechanism for a body of a vehicle provided with a movable window and a window frame having a channel portion, said window frame having a curved surface at its outer side, the combination of a frame member having a flange mounted in said channel portion of said window frame, said frame member being provided with a channel portion at its outer side, an outer surface of said channel portion tightly engaging said curved surface at the outer side of said window frame, a cushion member supported in said channel portion of said frame member, a pair of brackets rotatably supported by said frame member, a deflector member supported by said pair of brackets and adapted to engage said cushion member, and means for securing said frame member to said window frame, said means being located between said flange and said channel portion of said frame member.

15. In a deflector mechanism for a body of a vehicle provided with a door having a movable window together with a window frame having a rounded corner at its outer side, the combination of a supporting member secured to said window frame and provided with a wall portion extending at right angles to the window opening and tangent to said rounded corner, said wall portion terminating in a channel portion having outer surfaces engaging said rounded corners at the outer side of said window frame member, a pair of brackets rotatably supported by said supporting member, a cushion member in said channel portion of said support member, and a deflector member mounted in said pair of brackets and adapted to rotate therewith to open or closed positions relative to said cushion member, said deflector having its total length contained within the maximum cross section of said door, said cross section being taken in a horizontal plane through said door when said deflector is in its closed position.

16. In a deflector mechanism for a body of a vehicle having a door together with a movable window and window frame provided with a groove for receiving the movable window therein, the combination of a frame member supported on the frame of the door and provided with a flange extending into said groove, said frame member having a wall portion extending transversely relative to the window, said wall portion terminating at its outer edge in a channel portion, said channel portion extending substantially for the total length of said frame member, a pair of brackets rotatably supported by said frame member, a cushion member mounted in the channel portion of said frame member, and a deflector member mounted in said pair of brackets and lying solely in a plane in an up and down direction, said deflector member being adapted to engage said cushion member to form, with said wall portion of said frame member, a closure at the uppermost and lowermost and front sides of a space formed between said deflector member and said movable window of the vehicle.

17. In a deflector mechanism for a body of a vehicle provided with a movable window in a window frame, the combination of a frame member supported on said window frame and provided with a channel portion extending substantially for the total length of said frame member at its outer side, said frame member having a length sufficient to engage upper, lower and frontal portions of said window frame, said channel portion having its inner side wall located adjacent said window frame, a cushion member mounted in said channel portion of said frame member, a deflector member rotatably supported by said frame member and adapted to engage said cushion member, and a gasket member compressed between said frame member and said window frame adjacent said channel portion to provide sealing means therebetween, said gasket member extending substantially for the total length of said frame member.

18. In a deflector mechanism for a body of a vehicle provided with a movable window and a window frame having a groove for receiving the movable window therein, said window frame having a curved surface between its frontal outer side and said groove, the combination of a supporting member having a flange mounted in said groove together with a wall portion extending tangent to said curved surface of said window frame, the outer edge portion of said wall portion being formed to provide a channel portion extending forwardly of said wall portion and having a corner surface substantially engaging said curved surface of said window frame to provide a closure between said supporting member and said curved surface of said window frame, a cushion member mounted in said channel portion of said frame member, and a deflector member rotatably supported by said frame member and adapted to engage said cushion member.

19. In a deflector mechanism for a body of a vehicle provided with a window frame having an opening therethrough together with a window movably mounted in said opening, the combination of a groove in said window frame and extending around said opening, said groove receiving said window therein, a depressed portion in said window frame and extending around the front portion only of said opening, a cushion member mounted in said depressed portion of said window frame, and a deflector member rotatably supported and adapted to engage said cushion member to form, with said window, a relatively narrow passage connecting the interior of the body and the outside atmosphere.

20. In a deflector mechanism for a vehicle provided with a window, the combination of a frame member mounted adjacent said window and provided with a channel, a cushion member mounted in said channel, a pair of brackets rotatably supported by said frame member, a deflector member mounted in said pair of brackets, and resilient thrust means for providing tension between said frame member and one of said pair of brackets.

21. In a baffle plate ventilator mechanism for a body of a vehicle having a movable glass window together with a window frame provided with a groove for holding a cushion member for receiving the movable glass window therein, the combination of a frame member supported on said window frame and provided with a flange between said cushion member and a side of said groove, said frame member being substantially equal in width throughout its total length to permit it to be contained within the width of the portion of the body in which the window frame is mounted, and a baffle plate rotatably mounted in said frame member and adapted to be adjusted to open and closed positions relative to said movable glass window, said baffle plate being located within the width of said portion of the body, in which said window frame is mounted, when said baffle plate is in a closed position relative to said movable glass window.

22. In a baffle plate ventilator mechanism for a body of a vehicle having a movable glass window together with a window frame provided with a groove for holding a cushion member for receiving the movable glass window therein, the combination of a frame member supported on said window frame and provided with a flange between said cushion member and a side of said groove, said frame member being substantially equal in width throughout its total length, said frame member being contained within the width of the portion of the body in which said window frame is mounted, a pair of brackets rotatably supported in said frame member and having a common axis, and a baffle plate supported by said pair of brackets and adapted to be adjusted to open and closed positions relative to said movable glass window, said baffle plate and said pair of brackets being located within the width of said portion of the body, in which said window frame is mounted, when said baffle plate is in a closed position relative to said movable glass window.

23. In a baffle plate ventilator mechanism for a body of a vehicle having a movable window together with a window frame therefor, the combination of a frame member mounted and extending adjacent the front, lower and upper sides of the window frame of said window and positioned solely within the cross sectional area of the portion of said body in which said window frame is mounted, bracket members rotatably supported in oppositely disposed portions of said frame members and having a common axis, said bracket members each being provided with a cushion member having a channel portion, a baffle plate having end portions supported by said cushion members, the axis of said baffle plate being positioned in alignment with the axes of said bracket members, said baffle plate being adapted to be rotatably moved to a closed position relative to said frame member, said baffle plate being positioned within said cross sectional area of said portion of the body, in which said window frame is mounted, when said baffle plate is in said closed position, and means forming a closure between said frame member and said baffle plate when said baffle plate is in said closed position relative to said frame member.

24. In a baffle plate ventilator mechanism for a window of a vehicle, said window having a window frame provided with a corner portion, the combination of a frame member curved to fit the frame of the window and provided with a curved end portion for fitting said corner portion of the window frame together with an overhanging end portion oppositely disposed to said curved end portion, said frame member having a width substantially equal through its total length, said width of said frame member being less than the width of said window frame, and permitting said frame member to be assembled within the cross sectional area of said window frame, and a baffle member rotatably supported between said curved end and said overhanging end portions of said frame member for rotation about an axis intersecting said curved end portion.

25. In a baffle plate ventilator mechanism for a window of a door of a vehicle, the combination of a frame member mounted adjacent said window and at the front side of the window opening, said frame member having a width sufficient to assemble solely between said window and the outside surface of said door, a baffle member rotatably supported by said frame member and having its axis located in a plane positioned between said window and the outside of said door, and a cushion member supported by said frame member and provided with a resilient flange adapted to engage and form a closure member with said baffle member when said baffle member is in a closed position relative to said frame member, said resilient flange being located between said window and the outside surface of said door, said resilient flange extending adjacent and engaging the outer side surface of the front edge portion of said baffle plate when said baffle plate is in a closed position relative to said frame member.

26. In a baffle plate ventilator mechanism for use with a movable window of a vehicle, said movable window having a window frame having a front corner portion, the combination of support means mounted adjacent the front side of said window frame and provided with a lower portion having its rear end located adjacent said corner portion of said window frame, said support means having an upper portion having its rear end located substantially to the rear of said end of said lower portion of said support means, and a baffle plate rotatably supported by said support means, the axis of said baffle plate extending longitudinally thereof and through said lower and said upper portions of said support means, said axis extending downwardly and forwardly through said front corner portion of said window frame, the trailing side of said baffle plate extending downwardly and forwardly and providing a clearance space between the lower inside surface of said window frame and said trailing side of said baffle plate, said clearance space being of sufficient area to permit an arm of a driver of the vehicle to extend outwardly therefrom and under said baffle plate when said movable window is in open position.

27. In a baffle plate ventilator mechanism for use with a window, the combination of support means mounted adjacent said window and provided with a channel portion, a baffle plate rotatably supported by said support means, and a cushion member supported by said support means and provided with a main body portion mounted in said channel portion of said support means, said cushion member being constructed of resilient material and provided with a tapered flange portion extending from said main body portion, said tapered flange portion having a side surface adapted to engage a side surface of an edge portion of said baffle plate, the edge surface of said baffle plate being spaced a substantial distance from said main body portion of said cushion member to permit said baffle plate to swing in opposite directions adjacent and past said tapered flange, said tapered flange being displaced to extend between said edge surface of said baffle plate and said main body portion when said baffle plate is rotated to engage said tapered flange.

28. In a baffle plate ventilator mechanism for use with a movable window of a vehicle, said movable window having a window casing, the combination of a U shaped member mounted solely within said window casing between its outer side and said movable window, a baffle member rotatably mounted and adapted to be moved to a closed position relative to a sealing means supported in said U shaped member, said baffle member being located solely within said casing between its outer side and said movable window when said baffle member is in its closed position relative to a sealing means, and a sole cushion member comprising a resilient flange utilized as said sealing means and adapted to engage a sole side of said baffle member when said baffle member is in its closed position, said resilient flange being adapted to be displaced transversely outwardly and inwardly relative to said movable window by rotatable movement of said baffle plate, the edge surface of said baffle plate adjacent said sole side, engaged by said resilient flange, together with said cushion member, forming a space of sufficient width to receive said resilient flange therein when displaced inwardly by rotatable movement of said baffle plate from a position outside to a position inside of said resilient flange.

29. In a ventilator mechanism for use with a window having a window frame, the combination of a frame member secured to said window frame, a cushion member having a portion secured in said frame member, said portion having a rectangular cross section, said portion having a resilient flange extending therefrom outwardly of said frame, and a baffle member rotatably supported by said frame member and adapted to engage an inner side of said resilient flange to form a closure means therewith when said baffle member is in its closed position, said rectangular portion being spaced from said baffle member, said flange being sufficiently resilient to bend into the space between said portion and said baffle member upon rotation of the adjacent edge of said baffle member therepast in one direction.

30. In a baffle plate ventilator mechanism for a window provided with a window opening having a curved front side joined with a front lower corner portion, the combination of a curved support means adjacent said curved front side and said front lower corner portion of said window opening, said curved support means having its lower end portion positioned adjacent said front lower corner portion of said window opening, said curved support means having its upper end portion positioned above and substantially to the rear of said lower end portion, and a baffle member rotatably supported between said lower and upper end portions of said curved support means, said baffle member having an inclined axis, said baffle member having a curved front side conforming to the shape of said curved support means, said baffle member having a trailing side extending upwardly and rearwardly from said lower end portion of said support means and providing an open space under said trailing side of said baffle member and above the lower side of said window opening, said open space extending forwardly adjacent said lower corner portion of said window opening.

AUGUST E. WILSHUSEN.